United States Patent [19]

Debortoli et al.

[11] 4,406,510

[45] Sep. 27, 1983

[54] RETAINER FOR A CONNECTOR IN CROSS-CONNECT APPARATUS FOR TELECOMMUNICATIONS

[75] Inventors: George Debortoli; Brian T. Osborne, both of Ontario, Canada

[73] Assignee: Northern Telecom Limited, Montreal, Canada

[21] Appl. No.: 294,836

[22] Filed: Aug. 21, 1981

[51] Int. Cl.³ ............................................. H01R 13/58
[52] U.S. Cl. ........................... 339/103 M; 339/115 C; 339/125 R
[58] Field of Search ............ 339/97 P, 125 R, 103 M, 339/91 R, 115, 116, 107

[56] References Cited

U.S. PATENT DOCUMENTS

| | | | |
|---|---|---|---|
| 2,897,129 | 7/1959 | Farrar | 339/116 C |
| 3,858,158 | 12/1974 | Henn et al. | 339/115 R X |
| 4,099,823 | 7/1978 | O'Alessio | 339/97 P X |
| 4,226,494 | 10/1980 | Mazzeo et al. | 339/107 X |
| 4,262,985 | 4/1981 | Muehlaaussen | 339/103 M X |

Primary Examiner—Eugene F. Desmond
Attorney, Agent, or Firm—Sidney T. Jelly

[57] ABSTRACT

A retainer for a connector in cross-connect apparatus for telecommunications systems has a main body portion in which a connector fits, being retained by projections on a wall of the body portion which fit into recesses in the connector. The retainer has spaced pairs of legs at each end which fit over walls of a mounting member. Resilient guides between the legs enter slots in the walls to locate the retainer and a small rib or projection snaps into a hole in the wall to hold the retainer in position. A lid on the retainer snaps over the outer edge of the connector. Sealant is put in the bottom of the main body portion, and in the lid, to envelope the inner and outer edges of the connector and protect the terminal ends and conductors.

17 Claims, 9 Drawing Figures

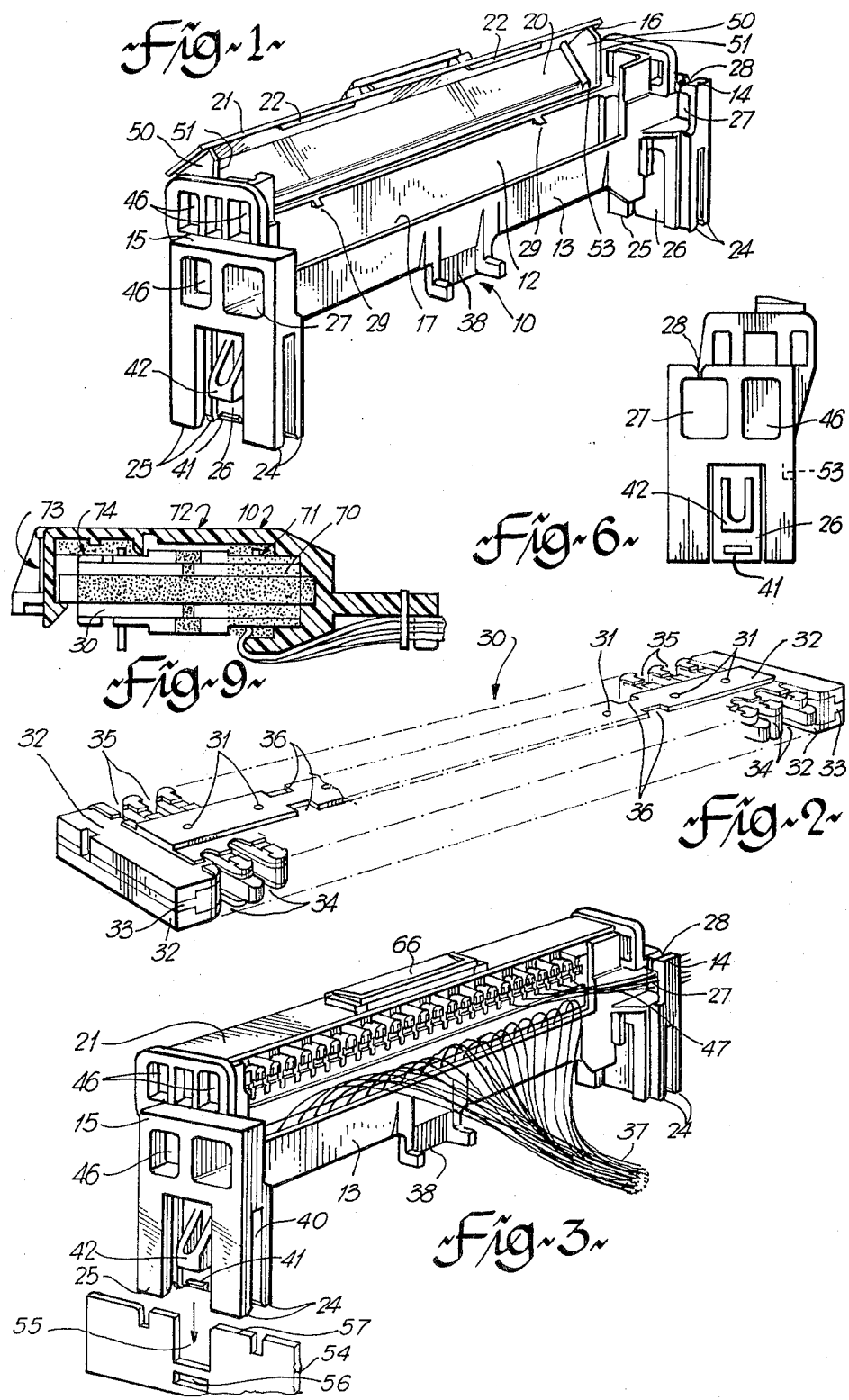

RETAINER FOR A CONNECTOR IN CROSS-CONNECT APPARATUS FOR TELECOMMUNICATIONS

This invention relates to cross-connect apparatus, for providing cross-connections in a telecommunications system, in a non-protective environment, for example outdoors, and particularly to a retainer for connectors in such apparatus, and to an assembly of retainer and connector.

Cross-connections are the electrical connections made between conductors of incoming cables, for example from telephones of subscribers, to cables leading to switching frames and similar items.

Generally cross-connections are made in protected environments, for example in Central Office buildings and similar "indoor" environments. However it is now desirable to be able to make cross-connections in non-protected environments, for example out-of-doors. Such cross-connections provide for interconnection of subscribers to cables routed to a Central Office.

The connectors as used for cross-connections, in the apparatus of the present invention, are double sided in that permanent connections are made to terminals on one side and changeable connections made to terminals on the other side, individual terminals extending across the connector from one side to the other. One typical form of connector is described In (U.S. Ser. No. 963,935, filed Nov. 27, 1978), in the name of the present assignees, the disclosure of which is included herein by specific reference.

The present invention provides a non-protected environment, hereinafter referred to for convenience as outdoor, system which provides a feeder, distribution interface concept, as used in the administration of the exchange customer cable network. It also provides the terminating cable network with protection against the environment. The connectors are housed in retainers which provide protection and the retainers can be housed in cabinets as a modular system. In particular the present invention is concerned with the retainer, and combination of retainer and connector.

In accordance with the invention, a retainer has a hollow body portion into which a connector can be clipped, the body portion including a base portion into which sealant compound can be placed prior to insertion of the connector. The retainer has a hinged lid which clips over the connector and the lid can also have some sealant compound placed therein. The retainer has formations for engaging with other formations on a mounting frame or tray. Certain shapings of container parts are made to prevent inward migration of water. Various other features and details, as will be readily appreciated by the following description of a particular embodiment, by way of example, in conjunction with the accompanying drawings, in which:

FIG. 1 is a perspective view of a retainer;

FIG. 2 is a perspective view of a connector for use with the retainer of FIG. 1;

FIG. 3 is a perspective view of a connector and retainer assembled together and feeder and distribution conductors connected and part of a mounting member illustrated;

FIG. 6 is an end view of the retainer in the direction of arrow A in FIG. 4;

FIG. 9 is a cross-section through a connector and retainer, showing positions of sealing compound.

Figure 4:
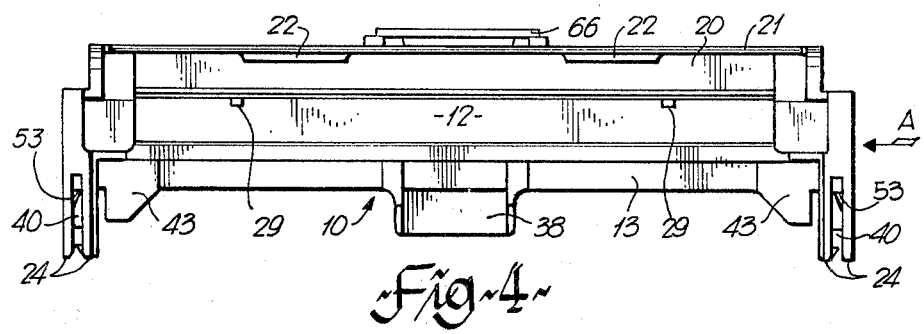
FIG. 4 is a front view of the retainer of FIG. 1, the lid in a closed condition.
Figure 5:
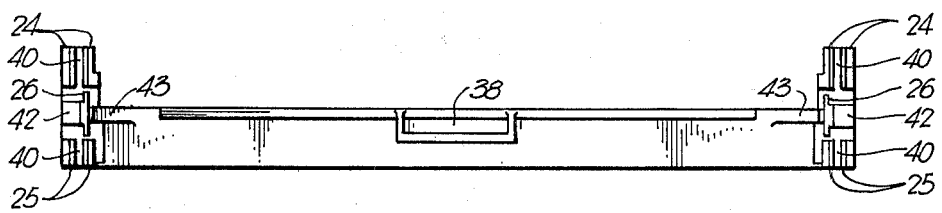
FIG. 5 is a bottom plan view of the retainer.

FIG. 1 illustrates a retainer, indicated generally at 10, the retainer having a main body portion with a back wall 12, a front wall 13, ends 14 and 15 and a hinged lid 16, hingedly attached to the top edge of the back wall 12 and extending the length thereof. The front wall has a reduced height, compared to the back wall, forming a shallow trough 17. The ends 14 and 15 extend up beyond the top edge of the back wall 12, the tops of the ends generally being flush with the top of the lid when the lid is closed.

The lid has a back web 20 and a top flange 21. Two short ribs 22 extend down from the front edge of flange 21. Additional details will be described later in connection with other Figures.

The ends 14 and 15 each are two pairs of spaced parallel legs 24, 25, and a flexible latch member 26. Towards the top and front of one of the ends, 14, is an aperture 27, a slot 28 providing access to the aperture. The other end can also have a similar aperture and slot, but in the embodiment illustrated the other end is not so provided. Two small projections 29 are spaced apart at the top edge of the back wall. Various other features and details will be described later in connection with other Figures.

FIG. 2 is a perspective view of a connector block, indicated generally at 30. Connector block 30, in the present example is as described in Canadian Pat. No. 1,086,389, in the name of the present assignees. The only modification is the provision of holes 31 in the side members 32 for injection of sealant compound into the assembled connector block. The block comprises side members 32 and a central member 33 in a sandwich formation. Held between each side member and the center member are a plurality of insulation displacing terminals, one end of each terminal positioned in a slot 34, and the other end positioned in a slot 35. The terminals alternate one side of the central member 33 to the other, there being a plurality of slots 34 and 35 along each edge of the connector. Thus, considering FIG. 2, there will be a terminal at the top end of the first slot 34 and a terminal at the bottom end of the second slot 34, and so on the length of the connector block. The terminals are held in position by formations on the mating surfaces of the central member 33 and the sides 32. Recesses 36 are also provided in each side member.

FIG. 3 illustrates a connector block assembled to a retainer. Initially a plurality of conductors 37 are connected to a connector block, the conductors all issuing from one side. The connector block is then pushed into the main body part of the retainer, the edge in which the conductors have been inserted being pushed down into the trough 17. The conductors extend up and over the top edge of the front wall 13. This top edge is rounded and is arranged so as to act as a strain relief for the conductors 37. The conductors 37 are collected together and taken down and tied to a tie-down web 38 extending from the bottom of the main body part. As the connector block is pushed down into the body, the projections 29 at the top edge of the back wall 12 (FIG. 1) engage in the recesses 36. In the connector block illustrated, two pairs of recesses 36 are provided, in each side member 32, to permit the block to be used in any orientation. Thus the connector block does not have to be positioned in a particular orientation prior to insertion of conductors 37. The projections 29 engage in that pair of recesses 36 in the side member 32 adjacent to the back wall 12 and farthest from the edge to which the conductors 37 have been connected.

The lid 16 is closed over the top edge of the connector block, the ribs 22 (FIG. 1) on the lid engaging over the edge of the connector block. The lid is hinged back for insertion of conductors into the top edge of the connector block and brought forward again after connection. The lid can also contain sealant to protect the exposed ends of the conductors.

Various additional features can be appreciated, and seen, from FIGS. 4, 5, 6, 7 and 8. As particularly seen in FIGS. 4, 5 and 8, the legs in each pair 24 and 25 are spaced apart and extend very approximately about half way up each side, the pairs of legs defining slots 40 which fit over mounting members on a mounting frame. As seen in FIGS. 1, 3, 5 and 6 the latch member 26 has a small projection 41 with an inclined lower surface positioned at the bottom of the latch member and a guide 42 positioned above the projection 41. In use, as the retainer is pushed on to the mounting member, the projection 41 and guide 42 move down a slot in the member, a slot at each side. The latch member 26 meets the bottom of the slot, is deflected and then the projection 41 snaps into a hole or detent in the mounting member slightly beyond the bottom of the slot. The inner ends of the slots 40 contact the front edges of the mounting member. The retainer is then firmly held on the mounting member. By pressing on the outer surfaces of the guides 42, the projections 41 can be released from the mounting member and the retainer removed. To avoid overflexing of the latch member, limit members 43 can be formed at each end on the outer surface of the bottom web 44 of the body portion. The top part 45 of each side is reduced in thickness, and various recesses 46 provided, to reduce the amount of unnecessary material and to avoid large areas of solid material, which can lead to molding problems.

To ensure one way mounting, the slots 40 are reduced in length for example at the back and a corresponding slot provided in the mounting member on which the retainer is to be mounted. Thus, the slots 40 between the pairs of legs 25 are reduced in length as indicated at 53 in FIGS. 4 and 8. This will prevent the retainer being pushed completely in and being locked by the latch members 26, if the retainer is not assembled to the support member with the correct orientation.

This can be appreciated from FIG. 3, in which part of a mounting member is indicated at 54. Slot 55 is the slot down which the guide 42 passes and hole or detect 56 is engaged by the projection 41. Slot 56 provides for the reduced length of the slots 40 at the back of the retainer, ensuring one way mounting. The inner ends of the slots 40 abut the front edges 57 of the mounting member. The mounting member, as illustrated, is provided for both ends of the retainer.

As stated previously, and illustrated in FIG. 3, the incoming conductors 37 in FIG. 3, are permanent connections, being anchored, or tied, by a tie to the tie-down web 38. The outgoing conductors, indicated at 47 in FIG. 3, which are connected at the exposed end of the connector block, pass along the connector and out through the aperture 27. Conductors can be fed into the aperture through slot 28.

In actual use the retainer is positioned so that the top flange 21 of the lid faces forward, that is with the back web 20 and the back wall 12 of the body facing upwards and being substantially horizontal. Thus the outgoing conductors are beneath the connector block. The exposed ends of the incoming conductors 37 will be protected by the sealant trough and the exposed ends of the outgoing conductors may be protected by sealant put in the lid.

Thus, with the connector and retainer mounted on the mounting member, the connector block is sheltered in that the retainer extends over the connector. However, if water, for example from condensation, does drip on to the retainer, it can run down between the ends of the lid and the sides 14 and 15. To prevent such water flowing back under, the lid has a tapered web at each end, indicated at 50 in FIG. 1. This web is tapered so that its inner edge 51 slopes down and forward to the lower edge 53 of the top flange 21 of the lid. Any water flowing under the lid will flow down the webs 50 and drip off.

Figure 8:
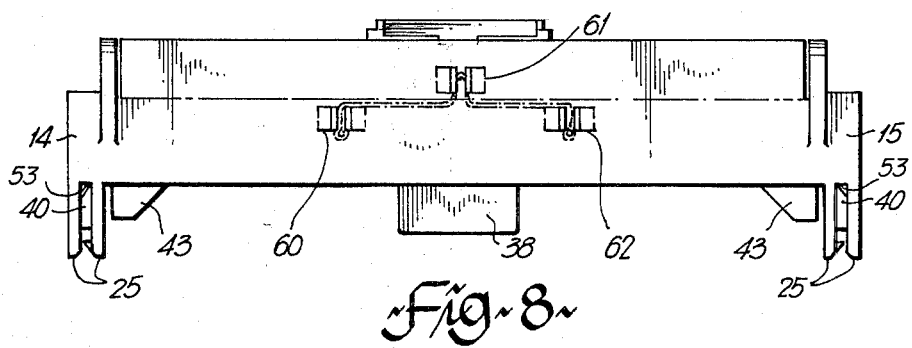
FIG. 8 is a back view of the retainer.
Figure 7:
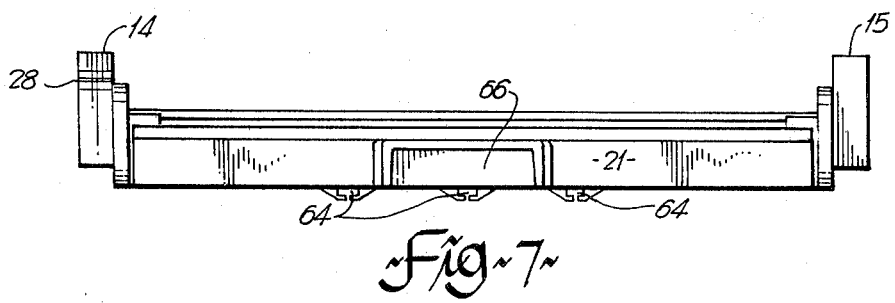
FIG. 7 is a top plan view of the retainer.

Preferably the lid 16 is biased to a closed condition. One way of providing for this is to attach a spring to the back wall 12 of the body and to the back web 20 of the lid. In FIGS. 7 and 8 three attachment points or positions 60, 61 and 62 are shown, two, 60 and 62, spaced apart laterally on the outer surface of the back wall 12 of the body and one, 61 at the center of the back web 20 of the lid. The positions 60 and 62 are generally symmetrical about 61. Each position is in the form of a bracket or protrusion having a Tee-shaped slot 64, as particularly seen in FIG. 7. A spring wire, 65 somewhat in the shape of a shallow Y with a short leg, fits in the Tee slots, the leg at position 61, and the tips of the Y at the positions 60, 62. This is shown in FIG. 8. Both the tips and the legs are preferably in the form of loops, although only the leg may be looped as the stress in the spring will cause the tips to reside at the outer side of the slot in the brackets on the body. A recess 66 on the outer surface of the lid provides a position for an identifying label.

FIG. 9 is a cross-section through an assembled connector and retainer. The connector is indicated at 30, and the retainer at 10. Sealing compound fills the interior of the connector, at 70. Sealing compound also surrounds the inner end of the connector and conductors connected to the inner end, as indicated at 71. The hinge for the lid is at 72, the lid indicated at 16. The designation card is seen at 73. The sealant encapsulating the cut ends the cross-connect conductors is indicated at 74.

What is claimed is:

1. A retainer for a connector in cross-connect apparatus for telecommunications systems, said retainer comprising:

a main body portion having a back wall, a front wall and ends;

a lid hingedly attached to a top edge of said back wall;

said front wall being of a reduced height relative to said back wall;

two pairs of spaced apart parallel legs on each end, said legs extending below said main body portion, each pair of legs defining a slot, the slots at an end co-planar;

a latch member positioned between the pairs of legs, at each end, said latch member including a projection at a lower end, projecting into said plane of said slots, and a guide positioned above said projection and projecting across said plane.

2. A retainer as claimed in claim 1, including an aperture in one end above said legs, and a slot in one wall of said aperture.

3. A retainer as claimed in claim 1, including projections on an inner surface of said back wall, adjacent to said top edge.

4. A retainer as claimed in claim 1, including at least one rib extending downward from a front edge of said lid.

5. A retainer as claimed in claim 1, said lid including a back web and a top flange, said back web extending upward, in the same plane as said back wall, in the closed position.

6. A retainer as claimed in claim 5, said ends extending up to a top edge substantially level with said back web of said lid.

7. A retainer as claimed in claim 1, said pairs of legs each including an inner leg and an outer leg, said slot between said inner and outer legs, said latch member substantially in the plane of said inner legs, said guide extending across said slot.

8. A retainer as claimed in claim 1, including a strain relief member extending downward from a bottom surface of the main body portion.

9. A retainer as claimed in claim 1, including means for resiliently urging said lid to a closed position.

10. A retainer as claimed in claim 5, including a web at each end of said lid, extending between said back web and said top flange, said webs having an inclined edge extending forward and downward from said back web towards a bottom edge of said top flange.

11. A retainer as claimed in claim 1, including a connector in said main body portion, and a volume of sealant in a bottom portion of said body portion surrounding the inner edge of said connector.

12. A retainer assembly as claimed in claim 11, including sealant material in said lid, surrounding the outer edge of said connector.

13. A retainer assembly as claimed in claim 11, said connector including recesses in a side surface, including projections on an inner surface of said back wall, adjacent to said top edge, said projections entered in said recesses to retain said connector in position.

14. A retainer assembly as claimed in claim 11, including at least one rib extending downward from a front edge of said lid, said rib snapped over an outer edge of said connector.

15. A retainer assembly as claimed in claim 11, said connector having a plurality of terminals therein, said terminals extending from an inner edge to an outer edge of said connector.

16. A retainer assembly as claimed in claim 15, said terminals extending in two parallel rows for the length of the connector, the terminals in each row spaced apart, the terminals in one row aligned with spaces between terminals in the other row.

17. A retainer assembly as claimed in claim 11, said front wall of said main body portion of reduced height to define a shallow trough, said front wall covering said slots on said inner edge of said connector and positioned adjacent to said connector, to act as a strain relief to conductors inserted in said inner edge of said connector.

* * * * *